US011498704B2

(12) United States Patent
Laurens et al.

(10) Patent No.: US 11,498,704 B2
(45) Date of Patent: Nov. 15, 2022

(54) DEVICE AND METHOD FOR DETERMINING THE ATTITUDE OF A SATELLITE EQUIPPED WITH GYROSCOPIC ACTUATORS, AND SATELLITE CARRYING SUCH A DEVICE

(71) Applicant: AIRBUS DEFENCE AND SPACE SAS, Toulouse (FR)

(72) Inventors: Philippe Laurens, Toulouse (FR); Jeremy Lesprier, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/598,201

(22) PCT Filed: Mar. 17, 2020

(86) PCT No.: PCT/FR2020/050574
§ 371 (c)(1),
(2) Date: Feb. 28, 2022

(87) PCT Pub. No.: WO2020/193916
PCT Pub. Date: Oct. 1, 2020

(65) Prior Publication Data
US 2022/0250773 A1 Aug. 11, 2022

(30) Foreign Application Priority Data
Mar. 25, 2019 (FR) ....................... 19 03104

(51) Int. Cl.
*B64G 1/28* (2006.01)
*B64G 1/10* (2006.01)
(Continued)

(52) U.S. Cl.
CPC ........... *B64G 1/288* (2013.01); *B64G 1/1021* (2013.01); *B64G 1/244* (2019.05); *B64G 1/286* (2013.01);
(Continued)

(58) Field of Classification Search
CPC ...... B64G 1/288; B64G 1/1021; B64G 1/244; B64G 1/286; B64G 1/361; B64G 2001/1028; G01C 21/24
See application file for complete search history.

(56) References Cited

U.S. PATENT DOCUMENTS

| 6,263,264 B1 | 7/2001 | Herman et al. |
| 2004/0122568 A1 * | 6/2004 | Montfort ................ B64G 1/244 701/4 |

(Continued)

FOREIGN PATENT DOCUMENTS

| DE | 60037366 T2 * | 12/2008 | ................ B64G 1/28 |
| EP | 3144228 A1 * | 3/2017 | ................ B64G 1/10 |

(Continued)

OTHER PUBLICATIONS

Douw Steyn, "Variable Speed Scissored Pair Dual Gimbal Control Moment Gyro for Nano-Satellites", Thesis presented in the Faculty of Engineering at Stellenbosch University, Department of Electrical and Electronic Engineering, Dec. 2015, 141 pages.

(Continued)

*Primary Examiner* — Behrang Badii
*Assistant Examiner* — Jalal C Coduroglu
(74) *Attorney, Agent, or Firm* — Nixon & Vanderhye P.C.

(57) ABSTRACT

A device for determining an attitude of a satellite is disclosed, the satellite having an attitude control system comprising a gyroscopic actuator including a flywheel mounted so as to be rotatable around an axis of rotation and carried by a gimbal articulated to rotate around an axis of rotation.

(Continued)

The device includes an attitude sensor configured to measure the attitude of the satellite, a position sensor configured to measure the angular position of the gimbal around its axis of rotation, a speed sensor configured to measure the rotational speed of the flywheel, and a processing circuit configured to determine the attitude of the satellite by using the measurement of the angular position of the gimbal, the measurement of the rotational speed of the flywheel, and the measurement of the attitude of the satellite.

15 Claims, 3 Drawing Sheets

(51) Int. Cl.
 *B64G 1/36* (2006.01)
 *G01C 21/24* (2006.01)
 *B64G 1/24* (2006.01)

(52) U.S. Cl.
 CPC .............. *B64G 1/361* (2013.01); *G01C 21/24* (2013.01); *B64G 2001/1028* (2013.01)

(56) References Cited

U.S. PATENT DOCUMENTS

| | | | | |
|---|---|---|---|---|
| 2008/0035797 | A1* | 2/2008 | Defendini | B64G 1/244 244/165 |
| 2010/0314499 | A1* | 12/2010 | Sperandei | B64G 1/283 244/165 |
| 2013/0105633 | A1* | 5/2013 | Lagadec | B64G 1/1021 244/165 |
| 2013/0125667 | A1* | 5/2013 | Fitz-Coy | B64G 7/00 73/862.041 |
| 2015/0088453 | A1* | 3/2015 | Lagadec | G01D 5/142 702/151 |
| 2017/0081050 | A1* | 3/2017 | Gans | G01C 19/16 |
| 2017/0336807 | A1* | 11/2017 | Ala | B64G 1/244 |

FOREIGN PATENT DOCUMENTS

| | | | | | |
|---|---|---|---|---|---|
| FR | 2861690 | A1 * | 5/2005 | | B64G 1/286 |
| FR | 2924095 | A1 * | 5/2009 | | B64G 1/28 |
| FR | 2 957 895 | | 9/2011 | | |
| FR | 2957895 | A1 * | 9/2011 | | B64G 1/1021 |
| FR | 2975180 | A1 * | 11/2012 | | B64G 1/283 |
| WO | 2012/152669 | | 11/2012 | | |
| WO | WO-2012152669 | A1 * | 11/2012 | | B64G 1/283 |

OTHER PUBLICATIONS

English Translation of the French International Preliminary Report on Patentability for PCT/FR2020/050574, dated May 7, 2021, 8 pages.
French Search Report and Written Opinion for Application No. FR1903104, dated Dec. 10, 2019, 11 pages.
French International Search Report with English Translation for PCT/FR2020/050574, dated Jul. 29, 2020, 6 pages.
French Written Opinion of the ISA for PCT/FR2020/050574, dated Jul. 29, 2020, 10 pages.
French International Preliminary Report on Patentability for PCT/FR2020/050574, dated May 7, 2021, 10 pages.

* cited by examiner

DEVICE AND METHOD FOR DETERMINING THE ATTITUDE OF A SATELLITE EQUIPPED WITH GYROSCOPIC ACTUATORS, AND SATELLITE CARRYING SUCH A DEVICE

CROSS REFERENCE TO RELATED APPLICATIONS

The present application is a National Phase of International Application Number PCT/FR2020/050574 filed Mar. 17, 2020, which designated the U.S. and claims priority benefits from French Application Number FR 1903104 filed Mar. 25, 2019, the entire contents of each of which are hereby incorporated by reference.

TECHNICAL FIELD

This invention lies within the field of artificial satellites for which the attitude is controlled by means comprising one or more inertial actuators. More particularly, this invention relates to a method and a device for determining the attitude of a satellite carrying inertial actuators of the gyroscopic actuator type, as well as a satellite carrying such a device.

PRIOR ART

To determine the attitude of a satellite, it is known to embed a star tracker in the satellite. Such a star tracker is an optical sensor which observes an area of space, and which determines the attitude of said satellite according to the positions of stars in its field of view. However, measurements made by a star tracker are sometimes too noisy or unavailable (glare, etc.) for determining the attitude of the satellite with sufficient precision when based solely on the measurements of the star tracker.

It is also known to determine the variations in attitude of an artificial satellite by embedding rate gyros in the satellite. Rate gyros are kinetic sensors that measure the rotational speed of the satellite, the rotational speed making it possible to determine variations in attitude of the satellite. In practice, it is not uncommon to have four or more rate gyros in a satellite, for determining the variations in attitude of said satellite.

Current devices for determining attitude are generally equipped with both rate gyros and star trackers. Such devices make it possible to determine the attitude of the satellite with good precision, because the measurements provided by the rate gyros allow filtering out the measurement noise from the star trackers. However, such devices are expensive, in particular due to the presence of numerous rate gyros.

U.S. Pat. No. 6,263,264 discloses a satellite with no rate gyros which uses measurements of the rotation of reaction wheels of said satellite to improve the precision of the attitude determination. However, such a solution is only applicable for reaction wheels, and is not applicable when the inertial actuators are gyroscopic actuators.

SUMMARY OF THE INVENTION

The object of the invention is to remedy the disadvantages of devices proposed by the prior art, in particular those described above, by proposing a solution which allows satellites equipped with gyroscopic actuators to have devices for determining attitude which are without any rate gyros, while reducing the impact of measurement noise from star trackers on the attitude determination.

According to a first aspect, the invention relates to a device for determining an attitude of a satellite, said satellite being provided with an attitude control system comprising at least one gyroscopic actuator, said at least one gyroscopic actuator comprising a flywheel mounted so as to be rotatable around an axis of rotation, said flywheel being carried by a gimbal articulated to rotate around an axis of rotation, said device comprising an attitude sensor capable of measuring the attitude of said satellite. Said device further comprises:
  a position sensor capable of measuring the angular position of the gimbal around its axis of rotation,
  a speed sensor capable of measuring the rotational speed of the flywheel,
  calculation means configured to determine the attitude of the satellite by using the measurement of the angular position of the gimbal carried out by the position sensor, the measurement of the rotational speed of the flywheel carried out by the speed sensor, and the measurement of the attitude of the satellite carried out by the attitude sensor.

Due to the principle of conservation of angular momentum, the rotational speed of the satellite, the rotational speed of the flywheel of the gyroscopic actuator, and the angular position of the gimbal of said gyroscopic actuator are linked. Therefore, by taking into account the rotational speed of the flywheel and the angular position of the gimbal it is possible to improve accuracy when determining the attitude, and optionally to avoid needing to use one or more rate gyros.

In some particular embodiments, the device for determining attitude may further comprise one or more of the following features, in isolation or in any technically possible combination.

In some particular embodiments, the attitude sensor comprises one or more star trackers.

In some particular embodiments, the calculation means comprise a rate gyro emulation module configured to determine a quantity, called the angular increment, representative of the variation in attitude of the satellite induced by the at least one gyroscopic actuator, by using the measurement of the angular position of the gimbal carried out by the position sensor and the measurement of the rotational speed of the flywheel carried out by the speed sensor, the attitude of the satellite being determined by using the angular increment and the measurement of the attitude of the satellite carried out by the attitude sensor.

In some particular embodiments, the calculation means comprise an estimation filter, for example a Kalman filter, which receives the angular increment and the measurement of the attitude of the satellite as input, and which outputs an estimate of the attitude of the satellite.

In some particular embodiments, the satellite being an observation satellite alternating between different attitude control phases comprising maneuvering phases and image capture phases, the calculation means are configured to apply weighting coefficients in order to weight the respective contributions, during the attitude determination, of the measurement from the attitude sensor on the one hand and of the measurements from the position sensor and speed sensor on the other hand, the weighting coefficients being dependent on the attitude control phase in progress and being determined in order to:
  during maneuvering phases: increase the contribution of the measurement from the attitude sensor relative to the contribution of the measurements from the position sensor and speed sensor, during image capture phases: increase the contribution of the measurements from the position sensor and speed sensor relative to the contribution of the measurements from the attitude sensor.

In some particular embodiments, the gimbal of the at least one gyroscopic actuator being articulated to rotate around two different axes and the position sensor being able to measure the respective angular positions of the gimbal around said two axes of rotation, the calculation means are configured to determine the attitude of the satellite by using the measurements of the respective angular positions of said gimbal around said two axes of rotation, carried out by the position sensor.

In some particular embodiments, the attitude control system comprising several gyroscopic actuators each comprising a gimbal, a flywheel, a position sensor, and a speed sensor, the calculation means are configured to determine the attitude of the satellite by using the measurements of the angular positions of the gimbals carried out by the position sensors, the measurements of the rotational speeds of the flywheels carried out by the speed sensors, and the measurement of the attitude of the satellite carried out by the attitude sensor.

According to a second aspect, the invention relates to a satellite comprising an attitude control system comprising at least one gyroscopic actuator, said at least one gyroscopic actuator comprising a flywheel mounted so as to be rotatable around an axis of rotation, said flywheel being carried by a gimbal articulated to rotate around an axis of rotation. The satellite comprises a device for determining attitude according to any of the embodiments of the invention.

In some particular embodiments, the satellite is without any rate gyros. According to a third aspect, the invention relates to a method for determining an attitude of a satellite, said satellite being provided with an attitude control system comprising at least one gyroscopic actuator, said at least one gyroscopic actuator comprising a flywheel mounted so as to rotate around an axis of rotation, said flywheel being carried by a gimbal articulated to rotate around an axis of rotation, the satellite further comprising an attitude sensor capable of measuring the attitude of said satellite. The at least one gyroscopic actuator being previously provided with a position sensor capable of measuring the angular position of the gimbal around its axis of rotation, and with a speed sensor capable of measuring the rotational speed of the flywheel around its axis of rotation, the method comprises steps of:
  measuring the angular position of the gimbal around its axis of rotation, by means of said position sensor,
  measuring the rotational speed of the flywheel around its axis of rotation, by means of said speed sensor,
  measuring the attitude of the satellite, by means of said attitude sensor,
  determining the attitude of the satellite by using the measurement of the angular position of the gimbal carried out by the position sensor, the measurement of the rotational speed of the flywheel carried out by the speed sensor, and the measurement of the attitude of the satellite carried out by the attitude sensor.

In some particular embodiments, the method for determining the attitude may further comprise one or more of the following features, alone or in any technically possible combination.

In some particular embodiments, the method for determining the attitude comprises a step of determining a quantity, called the angular increment, representative of the variation in attitude of the satellite induced by the at least one gyroscopic actuator, by using the measurement of the angular position of the gimbal carried out by the position sensor and the measurement of the rotational speed of the flywheel carried out by the speed sensor, the attitude of the satellite being determined by using the angular increment and the measurement of the attitude of the satellite carried out by the attitude sensor.

In some particular embodiments, the attitude of the satellite is determined by means of a Kalman filter.

In some particular embodiments, the satellite being an observation satellite alternating between different attitude control phases comprising maneuvering phases and image capture phases, said method for determining attitude comprises a use of weighting coefficients to weight the respective contributions, during the attitude determination, of the measurement from the attitude sensor on the one hand and of the measurements from the position sensor and speed sensor on the other hand, the weighting coefficients being dependent on the attitude control phase in progress and being determined in order to:
  during maneuvering phases: increase the contribution of the measurement from the attitude sensor relative to the contribution of the measurements from the position sensor and speed sensor,
  during image capture phases: increase the contribution of the measurements from the position sensor and speed sensor relative to the contribution of the measurements from the attitude sensor.

In some particular embodiments, the gimbal of the at least one gyroscopic actuator being articulated to rotate around two different axes and the position sensor being able to measure the respective angular positions of the gimbal around said two axes of rotation, the attitude of the satellite is determined by using the measurements of the respective angular positions of the gimbal around said two axes of rotation, carried out by the position sensor.

In some particular embodiments, the attitude control system comprising several gyroscopic actuators each comprising a gimbal, a flywheel, a position sensor, and a speed sensor, the attitude of the satellite is determined by using the measurements of the angular positions of the gimbals carried out the position sensors, the measurements of the rotational speeds of the flywheels carried out by the speed sensors, and the measurement of the attitude of the satellite carried out by the attitude sensor.

According to a fourth aspect, the invention relates to a computer program product comprising a set of program code instructions which, when executed by a processor, configure said processor to implement a method for determining attitude according to any one of the embodiments of the invention.

PRESENTATION OF FIGURES

The invention will be better understood by reading the following description, given as a non-limiting example, and made with reference to the figures which represent.

In these figures, identical references from one figure to another designate identical or similar elements. For clarity, the elements shown are not to scale unless otherwise stated.

DESCRIPTION OF EMBODIMENTS

Figure 1:
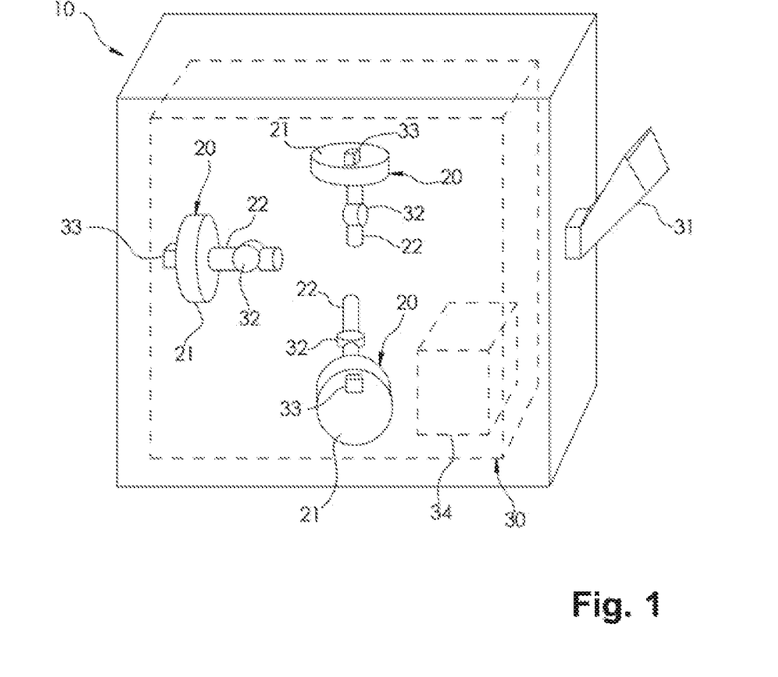
FIG. 1: a schematic representation of a satellite equipped with a device for determining attitude according to the invention.

FIG. 1 is a highly schematic representation of a satellite 10 comprising in particular an attitude control system.

The attitude control system comprises actuators making it possible to modify the attitude of the satellite 10, including at least one gyroscopic actuator 20, also known under the name of "Control Moment Gyroscope" or CMG in the literature.

In the exemplary embodiment illustrated by FIG. 1, the attitude control system comprises three gyroscopic actuators 20. However, in other embodiments not illustrated by the figures, nothing excludes having a different number of gyroscopic actuators.

Each gyroscopic actuator 20 comprises a flywheel 21 mounted so as to be rotatable around an axis of rotation. In addition, said flywheel 21 is carried by a gimbal 22 articulated to rotate around an axis of rotation, for example orthogonal to the axis of rotation of the flywheel 21. Generally, the flywheel 21 rotates at a substantially constant rotational speed, excluding control errors. To change the attitude of the satellite 10, the axis of rotation of the flywheel 21 is tilted by rotating the gimbal 22 around its axis of rotation. The rotation of the flywheel 21 and of the gimbal 22 around their respective axes of rotation is for example controlled by means of electric motors.

To control the attitude of the satellite 10 on three axes by means of gyroscopic actuators 20, it is generally necessary to use three gyroscopic actuators 20. However, according to other examples, nothing excludes considering a smaller number of gyroscopic actuators, for example if the attitude of the satellite 10 does not have to be controlled along three axes, or a larger number of gyroscopic actuators 20, for example for redundancy purposes.

It should also be noted that the invention is applicable to gyroscopic actuators 20 comprising two-axis gimbals 22, meaning gimbals 22 articulated to rotate around two different axes of rotation (not parallel). In the remainder of the description, we consider the case where each gimbal 22 is articulated to rotate around a single axis of rotation.

The attitude control system also comprises a device 30 for determining the attitude of the satellite 10.

The device 30 for determining attitude comprises an attitude sensor 31, capable of measuring the attitude of the satellite 10. Preferably, the attitude sensor 31 is preferably an optical sensor, and for example comprises one or more star trackers.

As illustrated in FIG. 1, the device 30 for determining attitude also comprises, for each gyroscopic actuator 20:
 a position sensor 32 capable of measuring the angular position of the gimbal 22 around its axis of rotation,
 a speed sensor 33 capable of measuring the rotational speed of the flywheel 21 around its axis of rotation.

For example, the position sensors 32 and/or the speed sensors 33 are Hall effect sensors and/or optical encoders, considered to be known to those skilled in the art. The invention is applicable to other types of position sensors 32 and/or speed sensors 33 however, and the choice of a particular type constitutes only one possible alternative implementation of the invention.

The device 30 for determining attitude also comprises a processing circuit 34. The processing circuit 34 is connected to the position sensors 32, to the speed sensors 33, and to the attitude sensor 31.

The processing circuit 34 comprises for example one or more processors and storage means (magnetic hard disk, electronic memory, optical disk, etc.) in which a computer program product is stored in the form of a set of program code instructions to be executed in order to perform all or part of the operations necessary to determine the attitude of the satellite 10.

Additionally or alternatively, the processing circuit 34 comprises one or more programmable logic circuits (FPGA, PLD, etc.), and/or one or more specialized integrated circuits (ASIC, etc.), and/or a set of discrete electronic components, etc., suitable for carrying out all or part of the operations necessary for determining the attitude of the satellite 10.

In other words, the processing circuit 34 corresponds to means configured by software (specific computer program product) and/or hardware (FPGA, PLD, ASIC, discrete electronic components, radio circuit, etc.) to perform some or all of the operations necessary for determining the attitude of the satellite 10.

Figure 2:
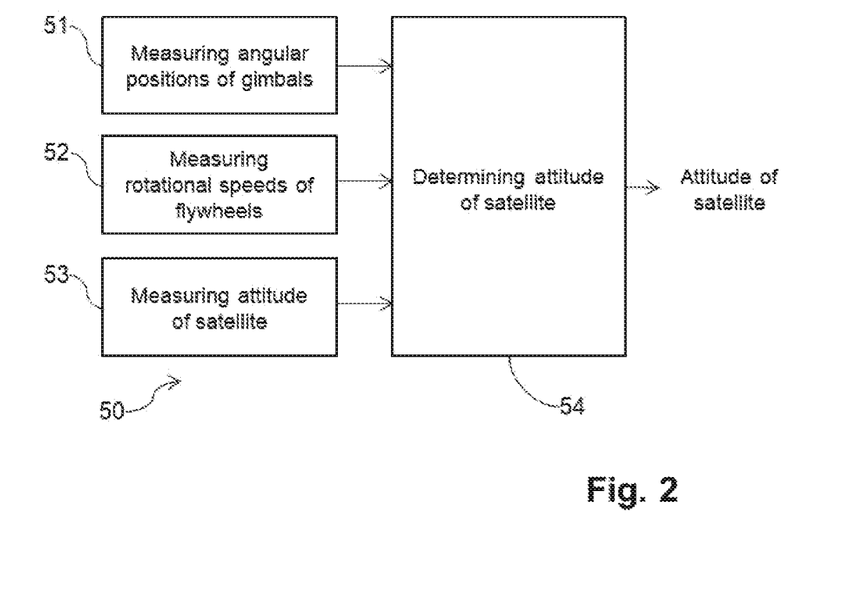
FIG. 2: a diagram illustrating the main steps of a method for determining attitude according to the invention.

FIG. 2 schematically represents the main steps of a method 50 for determining the attitude of the satellite 10, in the case where the attitude control system comprises several gyroscopic actuators 20. As illustrated by FIG. 2, the main steps of the method 50 for determining the attitude, implemented by the device 30 for determining attitude, are as follows:
 51 measurement of the respective angular positions of the gimbals 22 around their respective axes of rotation, by means of the respective position sensors 32 of said gimbals 22,
 52 measurement of the respective rotational speeds of the flywheels 21 around their respective axes of rotation, by means of the respective speed sensors 33 of said flywheels 21,
 53 measurement of the attitude of the satellite 10 by means of the attitude sensor 31,
 54 determination, by the processing circuit 34, of the attitude of the satellite 10 by using the measurements of the angular positions of the gimbals 22, the measurements of the rotational speeds of the flywheels 21, and the measurement of the attitude of the satellite 10.

Thus, the attitude of the satellite 10 is determined not only as a function of the attitude measurement supplied by the attitude sensor 31, but also as a function of measurements of the angular positions of the gimbals 22 supplied by the position sensors 32 and as a function of measurements of the rotational speeds of the flywheels 21 supplied by the speed sensors 33.

In fact, due to the principle of conservation of angular momentum, the variations in rotational speed of the satellite 10 are linked to the variations in angular positions of the gimbals 22 and rotational speeds of the flywheels 21 of the gyroscopic actuators 20. It is therefore understood that the measurements of the angular positions of the gimbals 22 and the measurements of the rotational speeds of the flywheels 21 can advantageously be used to improve precision in determining the attitude of the satellite 10 compared to using only measurements from the attitude sensor 31. Indeed, as the attitude measurements supplied by the attitude sensor 31 are noisy, the addition of measurements carried out by the position sensors 32 and speed sensors 33 makes it possible to filter out the noise from measurements from the attitude sensor 31.

In addition, the incorporation of measurements of the angular positions of the gimbals 22 and measurements of the rotational speeds of the flywheels 21 can be an alternative to the use of measurements provided by rate gyros, so that it is possible to have a satellite 10 with no rate gyro(s).

It should also be noted that the use of measurements of the angular positions of the gimbals 22 and of the rotational speeds of the flywheels 21 is effective provided that gyroscopic actuators 20 are the main source of variation in the attitude of the satellite 10. This will be the case, for example, when the attitude of the satellite 10 is controlled exclusively by gyroscopic actuators 20, and when external torques are negligible or precisely known (for example due to the fact that they vary slowly) over the characteristic time frame during which one wishes to reconstruct the variations in attitude.

Figure 3:
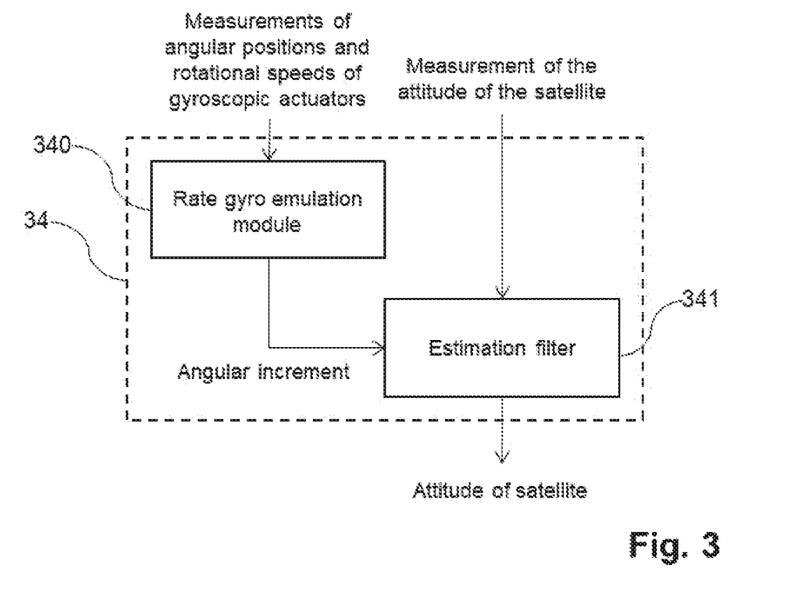
FIG. 3: a schematic representation of a preferred embodiment of a processing circuit of the device for determining attitude of FIG. 1, FIG. 4: a diagram illustrating a preferred mode of implementing a step of attitude determination by the processing circuit of FIG. 3, FIG. 5: curves illustrating the performance of the method for determining attitude.

FIG. 3 schematically represents a preferred embodiment of the processing circuit 34.

In the example illustrated in FIG. 3, the processing circuit 34 comprises a rate gyro emulation module 340.

The rate gyro emulation module 340 determines a quantity (vector), called an angular increment, representative of the variation in attitude of the satellite 10 induced by the action of the gyroscopic actuators 20, by using the measurements of the angular positions of the gimbals 22 carried out by the position sensors 32 and the measurements of the rotational speeds of the flywheels 21 carried out by the speed sensors 33.

The processing circuit 34 also comprises an estimation filter 341 which determines the attitude of the satellite 10 by using in particular the angular increment induced by the action of the gyroscopic actuators 20, determined by the rate gyro emulation module 340, and the measurement of the attitude of the satellite 10 carried out by the attitude sensor 31.

If the external torques are not negligible, the processing circuit 34 may also, in order to determine the attitude of the satellite 10, take into account another angular increment representative of the variation in attitude of the satellite 10 induced by the action of external torques on said satellite 10. The estimation of such an angular increment induced by the action of external torques on the satellite 10 can make use of any method known to those skilled in the art, and is outside the scope of the invention. For example, the angular increment induced by the action of external torques on the satellite 10 can also be calculated by the rate gyro emulation module 340, which then calculates a total angular increment which corresponds to the sum of the angular increment induced by the action of the gyroscopic actuators 20 on the one hand, and the angular increment induced by the action of external torques on the satellite 10 on the other hand. According to another example, the rate gyro emulation module 340 calculates only the angular increment induced by the action of the gyroscopic actuators 20, and it is for example the estimation filter 341 which can calculate the angular increment induced by the action of external torques.

When the external torques are negligible and/or when the rate gyro emulation module 340 calculates a total angular increment, the advantage of the embodiment illustrated by FIG. 3 lies in the fact that the same estimation filter 341 can be used both:

in a satellite with no rate gyros, by using position sensors 32 and speed sensors 33, and supplying as input to the estimation filter 341 the angular increment supplied by the rate gyro emulation module 340, in a satellite comprising one or more rate gyros, by supplying as input to the estimation filter 341 the angular increment supplied by the rate gyro(s).

As a result, it is not necessary to develop different estimation filters for satellites with no rate gyros and for satellites with one or more rate gyros. The same estimation filter 341 can be used in both cases, and it is sufficient to provide a rate gyro emulation module 340 in the event that the satellite 10 is without any rate gyro. Such a rate gyro emulation module 340 can also be provided in a satellite carrying one or more rate gyros, to overcome a possible failure of said rate gyros.

In general, the estimation filter 341 can be any type of dynamic estimation filter, and/or any type of static filter with constant gains, linear or non-linear. In preferred embodiments, the estimation filter 341 is for example a Kalman filter. In general, any type of Kalman filter can be implemented, and the choice of a particular type of Kalman filter only constitutes an alternative implementation of the invention. The estimation filter 341 may be, in a non-limiting example, a non-stationary non-linear Kalman filter, also known under the name Extended Kalman filter (EKF).

Figure 4:
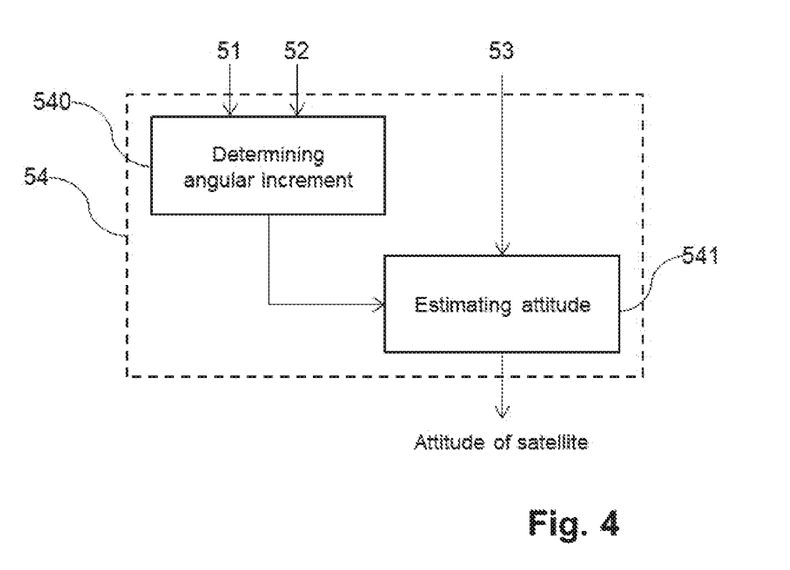

FIG. 4 schematically represents the main steps of the step 54 of determining the attitude of the satellite 10, in the case where the processing circuit 34 comprises a rate gyro emulation module 340 as illustrated by FIG. 3. As illustrated by FIG. 4, the step 54 of determining the attitude comprises steps of:

540 determination of the angular increment representative of the variation in attitude of the satellite 10 induced by the action of the gyroscopic actuators 20, by using in particular the measurements of the angular positions of the gimbals 22 carried out by the position sensors 32 and the measurements of the rotational speeds of the flywheels 21 carried out by the speed sensors 33, 541 estimation of the attitude of the satellite 10 by the estimation filter 341, by using in particular the angular increment induced by the gyroscopic actuators 20 (possibly included in a total angular increment) and the measurement of the attitude of the satellite 10 carried out by the attitude sensor 31.

We now describe a non-limiting example of calculating the angular increment induced by the gyroscopic actuators 20 at the scale of the satellite 10, by the rate gyro emulation module 340.

In the remainder of the description, the satellite 10 is considered to comprise $N_{act}$ gyroscopic actuators 20, and we denote by:

$\hat{J}_{sat}$ the matrix of inertia of the satellite 10 (for example expressed in kg·m$^2$), $\hat{J}_k$ the radial inertia of the flywheel 21 of the gyroscopic actuator 20 of rank k ($1 \leq k \leq N_{act}$) (for example expressed in kg·m$^2$), $\hat{J}_k^{gimb}$ the radial inertia of the gimbal 22 of the gyroscopic actuator 20 of rank k ($1 \leq k \leq N_{act}$) (for example expressed in kg·m$^2$), ($\widehat{u_k}$, $\widehat{v_k}$, $\widehat{w_k}$) the unit vectors in a coordinate system, of the gyroscopic actuator 20 of rank k ($1 \leq k \leq N_{act}$), expressed in a satellite coordinate system, $\omega_k(t_n)$ the measured rotational speed of the flywheel 21 of the gyroscopic actuator 20 of rank k ($1 \leq k \leq N_{act}$) at time $t_n$ (for example expressed in rad/s), $\sigma_k(t_n)$ the measured angular position of the gimbal 22 of the gyroscopic actuator 20 of rank k ($1 \leq k \leq N_{act}$) at time $t_n$ (for example expressed in rad), $\Delta t_{aocs} = t_n - t_{n-1}$ the sampling period considered for the attitude determination and attitude control.

With such notations, the angular increment induced by the action of the gyroscopic actuators 20 between two times $t_{n-1}$ and $t_n$, designated by $\underline{\Phi}_{ACT}[t_{n-1}, t_n]$, is then for example determined according to the following expression:

$$\underline{\Phi}_{ACT}[t_{n-1}, t_n] = \qquad \text{[Math. 1]}$$
$$-\hat{J}_{sat}^{-1} \sum_{N_{act}} \left( \hat{J}_i (C_k \widehat{\underline{u}}_k + S_k \widehat{\underline{v}}_k) + \hat{J}_k^{gimb} (\sigma_k(t_n) - \sigma_k(t_{n-1})) \widehat{\underline{w}}_i \right)$$

an expression in which:

$$C_k = \overline{\omega} \Delta t_{aocs} \left( 1 - \frac{\dot{\sigma}^2 \Delta t_{aocs}^2}{24} \right) \cos \overline{\sigma} - \frac{\gamma \dot{\sigma} \Delta t_{aocs}^3}{12} \sin \overline{\sigma} \qquad \text{[Math. 2]}$$

$$S_k = \overline{\omega} \Delta t_{aocs} \left( 1 - \frac{\dot{\sigma}^2 \Delta t_{aocs}^2}{24} \right) \sin \overline{\sigma} + \frac{\gamma \dot{\sigma} \Delta t_{aocs}^3}{12} \cos \overline{\sigma} \qquad \text{[Math. 3]}$$

$$\overline{\omega} = \frac{\omega_k(t_{n-1}) + \omega_k(t_n)}{2} \qquad \text{[Math. 4]}$$

$$\overline{\sigma} = \frac{\sigma_k(t_{n-1}) + \sigma_k(t_n)}{2} \qquad \text{[Math. 5]}$$

$$\dot{\sigma} = \frac{\sigma_k(t_n) - \sigma_k(t_{n-1})}{\Delta t_{aocs}} \qquad \text{[Math. 6]}$$

$$\gamma = \frac{\omega_k(t_n) - \omega_k(t_{n-1})}{\Delta t_{aocs}} \qquad \text{[Math. 7]}$$

In practice, this therefore amounts to combining the measurements of the rotational speeds of the flywheels 21 and the measurements of the angular positions of the gimbals 22 in order to reconstruct the current angular momentum induced by the gyroscopic actuators 20, projected in the satellite coordinate system. The current angular momentum is then integrated between two measurement times, then multiplied by the inverse of the matrix of inertia of the satellite 10 so as to obtain the angular increment sought for the gyroscopic actuators 20.

As indicated above, by means of the rate gyro emulation module 340, when it determines an angular increment similar to what a rate gyro would output (angular increment induced by the action of the gyroscopic actuators 20 if the external torques are negligible, or total angular increment in the opposite case), it is possible to use an estimation filter 341 intended for operating with one or more rate gyros. Consequently, at the output from the rate gyro emulation module 340, it is possible to use any estimation filter implemented in the prior art for determining the attitude of a satellite 10 based on measurements provided by rate gyros and measurements provided by an attitude sensor 31.

Below is a brief description of a non-limiting example of an estimation filter 341 that can be implemented in the processing circuit 34, in the case where the estimation filter 341 is a Kalman filter, for example a non-stationary non-linear Kalman filter.

In a manner that is known per se, a Kalman filter implements several steps which are executed iteratively. At each iteration, the Kalman filter mainly comprises two distinct phases well known to those skilled in the art, namely a prediction phase and an update phase, which aim to estimate the state of said Kalman filter. In the present case, the state of the Kalman filter includes at least the attitude of the satellite 10, for example expressed in the form of a quaternion. The state of the Kalman filter may also include other quantities to be estimated, for example such as the total angular momentum, external torques, etc.

In general, in a Kalman filter, the prediction phase uses the estimated state from the previous time to produce a prediction of the state for the current time. In the update step, the measurements of the current time are used to correct the predicted state in order to obtain a more accurate estimate of the state for the current time.

In a manner that is known per se, at each iteration a Kalman filter implements the following steps in particular:
  predicting the state of the Kalman filter, in other words predicting at least the attitude of the satellite 10, in particular as a function of the state estimated at the previous time,
  calculating a process noise covariance matrix,
  calculating an error covariance matrix for the predicted state, in particular as a function of the error covariance matrix for the state estimated at the previous time and of the process noise covariance matrix,
  calculating an innovation, as a function in particular of the predicted state and of the measurements for the current time,
  calculating Kalman gains, as a function in particular of the error covariance matrix for the predicted state and of an attitude measurement error covariance matrix,
  updating the state of the Kalman filter, and therefore of the attitude of the satellite 10, in particular as a function of the predicted state, the innovation, and the Kalman gains,
  updating the error covariance matrix for the state, as a function in particular of the error covariance matrix for the predicted state and of the Kalman gains.

For example, the step of predicting the state (containing in particular the attitude, for example expressed in the form of a quaternion) of the Kalman filter can calculate the predicted state based on a total angular increment supplied by the rate gyro emulation module 340, according to an Edwards algorithm.

If the rate gyro emulation module 340 only supplies the angular increment induced by the action of the gyroscopic actuators 20, and if the external torques are not negligible, then the step of predicting the state preferably implements an iterative algorithm which at each iteration updates an angular increment induced by the action of the external torques on the satellite 10. The iterative predictive algorithm is for example in the following form for predicting the attitude quaternion:

at time $t_n$, the quaternion $Q_{iter}$ is initialized to the quaternion estimated at the preceding time $\hat{Q}(t_{n-1})$,
  a quaternion is calculated by integration of the total angular increment (action of gyroscopic actuators and action of external torques) by using the Edwards algorithm:

$$Q_{iter} = \hat{Q}(t_{n-1}) \begin{pmatrix} 1 - \frac{\Phi(t_n)^2}{8} \\ \frac{1}{2}\left(1 - \frac{\Phi(t_n)^2}{24}\right)\Phi(t_n) + \frac{\Phi(t_{n-1}) \times \Phi(t_n)}{24} \end{pmatrix} \qquad \text{[Math. 8]}$$

an expression in which $\Phi$ is the total angular increment and corresponds to $\underline{\Phi} = \underline{\Phi}_{ACT} + \underline{\Phi}_H$, where $\underline{\Phi}_H$ is the angular increment induced by the action of the external torques and depends on the quaternion $Q_{iter}$ of the previous iteration (to express the total angular momentum in the satellite coordinate system), and $\underline{\Phi}_{ACT}$ corresponds to the angular increment induced by the gyroscopic actuators 20, explained above, the iterative algorithm stops when the difference between two successive quaternions $Q_{iter}$ is sufficiently low.

The innovation calculation corresponds, for example, to a difference between the predicted state (quaternion) and the measurement provided by the attitude sensor 31 for the current time. In other words, the total angular increment, determined using the measurements from the position sensors 32 and speed sensors 33 in particular, is not injected as a measurement during the innovation calculation. On the other hand, the total angular increment is used to calculate the predicted state (quaternion), as indicated above.

Next, the quaternion (state of the Kalman filter) is updated as a function of the predicted quaternion, the innovation, and the Kalman gains.

Figure 5:
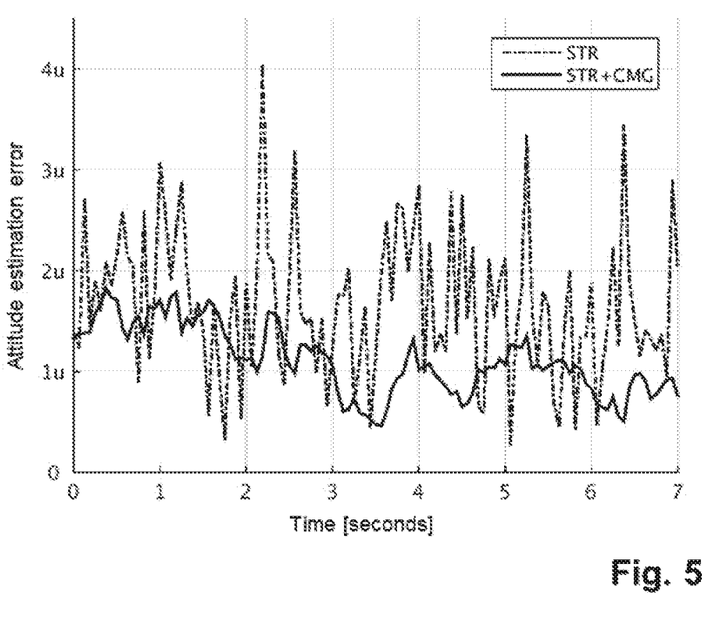

FIG. 5 schematically represents curves illustrating the performance of the method 50 for determining the attitude. More specifically, FIG. 5 represents the evolution, over time, of the error made in the determined attitude:

when the attitude is determined solely based on measurements of the attitude sensor 31 (dotted lines, labeled "STR" in FIG. 5), when the attitude is determined based on measurements of the attitude sensor 31 and based on measurements of the position sensors 32 and speed sensors 33 of the gyroscopic actuators, in accordance with the invention (solid lines, labeled "STR+CMG" in FIG. 5).

It should be noted that the units on the ordinate in FIG. 5 are not given in an absolute manner but only in a relative manner. However, the scales are identical between the two curves, STR on the one hand and (STR+CMG) on the other hand. It can be seen that, by taking into account the measurements of the position sensors 32 and speed sensors 33, the attitude determination performance is improved by a factor of up to 4 (on average by a factor of 2). Above all, the noise level is much lower, which is a significant advantage given the often high demands on pointing stability (especially for image capture applications in order to obtain "sharp" rendering).

In preferred embodiments of the step 54 of determining the attitude, it may be advantageous, during the attitude determination, to apply different respective weighting coefficients to the contribution of the measurements provided by the attitude sensor 31 on the one hand and to the contribution of the measurements provided by the position sensors 32 and speed sensors 33 of the gyroscopic actuators 20 on the other hand.

Such arrangements are particularly advantageous, in particular, in the case of an observation satellite alternating between maneuvering phases and image capture phases. It should be noted that it is possible to provide other phases of attitude control. In particular, it is possible, in a known manner, to provide a tranquilization phase between each maneuvering phase and each image capture phase.

During a maneuvering phase, which is a highly dynamic phase involving a switch from a first setpoint attitude to a second setpoint attitude, the measurements provided by the position sensors 32 and speed sensors 33 are less precise than the measurements provided by the attitude sensor 31. It is therefore understood that, during a maneuvering phase, it is advantageous to give priority to the measurements provided by the attitude sensor 31.

Conversely, during an image capture phase, the attitude must be stabilized around a setpoint attitude. The dynamics are therefore much lower and the performance of the attitude determination may be limited by the measurement noise from the attitude sensor 31. Consequently, it may be advantageous, during image capture phases, to take into account the measurements provided by the position sensors 32 and speed sensors 33, in order to filter out the measurement noise from the attitude sensor 31.

In the case for example of the Kalman filter described above, the measurements from the attitude sensor 31 are used to calculate the innovation, which is then multiplied by the Kalman gains during the step of updating the predicted state, said predicted state being calculated using the total angular increment (in other words using in particular the measurements from the position sensors 32 and speed sensors 33 of the gyroscopic actuators 20). Therefore, it is possible to determine the Kalman gains according to the attitude control phase, in order to have greater Kalman gains during maneuvering phases than during image capture phases. In this manner, the measurements from the attitude sensor 31 are taken into account to a greater extent during the maneuvering phases than during the image capture phases.

More generally, it should be noted that the embodiments and implementations considered above have been described as non-limiting examples, and that other variants are therefore conceivable.

In particular, the invention has been described mainly by considering a processing circuit 34 comprising a rate gyro emulation module 340. It should be noted, however, that the invention is also applicable without a rate gyro emulation module 340. For example, it is possible to provide the measurements from the position sensors 32 and speed sensors 33 of the gyroscopic actuators 20 directly as input to the estimation filter 341. Where appropriate, the calculations carried out by the rate gyro emulation module 340 can for example be integrated into said estimation filter 341.

Furthermore, the invention has been described primarily by considering gimbals 22 articulated to rotate around a single axis of rotation. However, the invention is also applicable in particular to the case of two-axis gimbals 22. Where appropriate, each position sensor 32 being able to measure the respective angular positions of the gimbal 22 around said two axes of rotation, the attitude of the satellite 10 is determined by using the measurements of the respective angular positions of each gimbal 22 around its two axes of rotation, carried out by the position sensor 32.

The above description clearly illustrates that, through its various features, the invention achieves the fixed objectives.

In particular, it is understood that, due to the use of measurements of the angular positions of the gimbals and measurements of the rotational speeds of the flywheels to determine the attitude of the satellite 10, in certain cases it will be possible to have a satellite 10 with no rate gyros.

The invention is, however, also applicable to satellites equipped with rate gyros, it being possible to use the measurements from the position sensors 32 and speed sensors 33 to supplement the measurements from the rate gyros, and/or to replace said measurements from the rate gyros when the rate gyros are defective.

The invention is applicable to any satellite for which the attitude is to be determined. In addition, the attitude determined for the satellite 10 can be used to control the attitude of the satellite 10. For example, the attitude control system can control the gyroscopic actuators 20 based on the difference between the determined attitude and a setpoint attitude of said satellite 10, in order to converge the attitude of said satellite 10 towards the setpoint attitude. The attitude determined for the satellite 10 can also be used to perform post facto processing of data acquired by this satellite 10. For example, in the case of a satellite 10 for observing the Earth or any other celestial body, the determined attitude can be transmitted to a ground station with the images captured by the satellite 10, in order to compensate for geometric deformations in said images that are introduced by variations in the attitude of the satellite during the capture of these images.

The invention claimed is:

1. A device for determining an attitude of a satellite, said satellite being provided with an attitude control system comprising at least one gyroscopic actuator, said at least one gyroscopic actuator comprising a flywheel mounted so as to be rotatable around an axis of rotation, said flywheel being carried by a gimbal articulated to rotate around an axis of rotation, said device comprising an attitude sensor capable of measuring the attitude of said satellite, wherein said device comprises:
   a position sensor configured to measure the angular position of the gimbal around its axis of rotation,
   a speed sensor configured to measure the rotational speed of the flywheel,
   calculation means configured to determine the attitude of the satellite by using the measurement of the angular position of the gimbal carried out by the position sensor, the measurement of the rotational speed of the flywheel carried out by the speed sensor, and the measurement of the attitude of the satellite carried out by the attitude sensor.

2. The device according to claim 1, wherein the attitude sensor comprises one or more star trackers.

3. The device according to claim 1, wherein the calculation means comprises a rate gyro emulation module configured to determine a quantity, called the angular increment, representative of the variation in attitude of the satellite induced by the at least one gyroscopic actuator, by using the measurement of the angular position of the gimbal carried out by the position sensor and the measurement of the rotational speed of the flywheel carried out by the speed sensor, the attitude of the satellite being determined by using the angular increment and the measurement of the attitude of the satellite carried out by the attitude sensor.

4. The device according to claim 3, wherein the calculation means comprises an estimation filter which receives the angular increment and the measurement of the attitude of the satellite as input, and which outputs an estimate of the attitude of the satellite.

5. The device according to claim 1, wherein, the satellite being an observation satellite alternating between different attitude control phases comprising maneuvering phases and image capture phases, the calculation means is configured to apply weighting coefficients in order to weight the respective contributions, during the attitude determination, of the measurement from the attitude sensor on the one hand and of the measurements from the position sensor and speed sensor on the other hand, the weighting coefficients being dependent on the attitude control phase in progress and being determined in order to:
   during maneuvering phases: increase the contribution of the measurement from the attitude sensor relative to the contribution of the measurements from the position sensor and speed sensor,
   during image capture phases: increase the contribution of the measurements from the position sensor and speed sensor relative to the contribution of the measurements from the attitude sensor.

6. The device according to claim 1, wherein the gimbal of the at least one gyroscopic actuator being articulated to rotate around two different axes and the position sensor being able to measure the respective angular positions of the gimbal around said two axes of rotation, the calculation means is configured to determine the attitude of the satellite by using the measurements of the respective angular positions of said gimbal around said two axes of rotation, carried out by the position sensor.

7. The device according to claim 1, wherein, the attitude control system comprising several gyroscopic actuators each comprising a gimbal, a flywheel, a position sensor, and a speed sensor, the calculation means is configured to determine the attitude of the satellite by using the measurements of the angular positions of the gimbals carried out by the position sensors, the measurements of the rotational speeds of the flywheels carried out by the speed sensors, and the measurement of the attitude of the satellite carried out by the attitude sensor.

8. A satellite comprising an attitude control system comprising at least one gyroscopic actuator, said at least one gyroscopic actuator comprising a flywheel mounted so as to be rotatable around an axis of rotation, said flywheel being carried by a gimbal articulated to rotate around an axis of rotation, wherein the satellite comprises a device for determining attitude according to claim 1.

9. The satellite according to claim 8, wherein it is without any rate gyros.

10. A method for determining an attitude of a satellite, said satellite being provided with an attitude control system comprising at least one gyroscopic actuator, said at least one gyroscopic actuator comprising a flywheel mounted so as to be rotatable around an axis of rotation, said flywheel being carried by a gimbal articulated to rotate around an axis of rotation, the satellite further comprising an attitude sensor configured to measure the attitude of said satellite,
   wherein the at least one gyroscopic actuator being previously provided with a position sensor configured to measure the angular position of the gimbal around its axis of rotation, and with a speed sensor configured to measure the rotational speed of the flywheel around its axis of rotation, the method comprises steps of:
   measuring the angular position of the gimbal around its axis of rotation, by means of said position sensor,
   measuring the rotational speed of the flywheel around its axis of rotation, by means of said speed sensor,
   measuring the attitude of the satellite, by means of said attitude sensor,
   determining the attitude of the satellite, by means of a processing circuit, by using the measurement of the angular position of the gimbal carried out by the position sensor, the measurement of the rotational speed of the flywheel carried out by the speed sensor, and the measurement of the attitude of the satellite carried out by the attitude sensor.

11. The method according to claim 10, comprising a step of determining a quantity, called the angular increment, representative of the variation in attitude of the satellite induced by the at least one gyroscopic actuator, by using the measurement of the angular position of the gimbal carried out by the position sensor and the measurement of the rotational speed of the flywheel carried out by the speed sensor, the attitude of the satellite being determined by using the angular increment and the measurement of the attitude of the satellite carried out by the attitude sensor.

12. The method according to claim 10, wherein, the satellite being an observation satellite alternating between different attitude control phases comprising maneuvering phases and image capture phases, said method comprises a use of weighting coefficients to weight the respective contributions, during the attitude determination, of the measurement from the attitude sensor on the one hand and of the measurements from the position sensor and speed sensor on the other hand, the weighting coefficients being dependent on the attitude control phase in progress and being determined in order to:
- during maneuvering phases: increase the contribution of the measurement from the attitude sensor relative to the contribution of the measurements from the position sensor and speed sensor,
- during image capture phases: increase the contribution of the measurements from the position sensor and speed sensor relative to the contribution of the measurements from the attitude sensor.

13. The method according to claim 10, wherein the gimbal of the at least one gyroscopic actuator being articulated to rotate around two different axes and the position sensor being able to measure the respective angular positions of the gimbal around said two axes of rotation, the attitude of the satellite is determined by using the measurements of the respective angular positions of said gimbal around said two axes of rotation, carried out by the position sensor.

14. The method according to claim 10, wherein, the attitude control system comprising several gyroscopic actuators each comprising a gimbal, a flywheel, a position sensor, and a speed sensor, the attitude of the satellite is determined by using the measurements of the angular positions of the gimbals carried out by the position sensors, the measurements of the rotational speeds of the flywheels carried out by the speed sensors, and the measurement of the attitude of the satellite carried out by the attitude sensor.

15. A computer program product, comprising a set of program code instructions which, when executed by a processor, configure said processor to implement a method according to claim 10.

* * * * *